(12) United States Patent
Balaganoor et al.

(10) Patent No.: US 12,113,775 B2
(45) Date of Patent: Oct. 8, 2024

(54) PRE-SHARED KEY BASED VIRTUAL PRIVATE NETWORK

(71) Applicant: Hewlett Packard Enterprise Development LP, Spring, TX (US)

(72) Inventors: Sreenatha Balaganoor, Karnataka (IN); Raghunandan Prabhakar, Karnataka (IN); Amit Agrawal, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 211 days.

(21) Appl. No.: 18/059,137

(22) Filed: Nov. 28, 2022

(65) Prior Publication Data

US 2024/0179131 A1 May 30, 2024

(51) Int. Cl.
*H04L 29/06* (2006.01)
*H04L 9/08* (2006.01)
*H04L 9/30* (2006.01)
*H04L 9/40* (2022.01)

(52) U.S. Cl.
CPC ........ *H04L 63/0272* (2013.01); *H04L 9/0838* (2013.01); *H04L 9/3073* (2013.01)

(58) Field of Classification Search
CPC .. H04L 63/0272; H04L 9/0838; H04L 9/3073
See application file for complete search history.

(56) References Cited

U.S. PATENT DOCUMENTS

| 7,613,920 B2 | 11/2009 | Gustave et al. |
| 9,065,802 B2 | 6/2015 | May |
| 10,581,638 B2 | 3/2020 | Kandasamy et al. |
| 10,673,901 B2 | 6/2020 | Robertson et al. |
| 10,979,395 B2 | 4/2021 | Hastings |
| 2006/0230446 A1 | 10/2006 | Vu |
| 2007/0055752 A1* | 3/2007 | Wiegand ............. H04L 63/0892 709/220 |
| 2007/0079368 A1* | 4/2007 | Takeyoshi ........... H04L 63/0209 726/15 |
| 2008/0022392 A1* | 1/2008 | Karpati .................... H04L 63/20 726/15 |
| 2008/0141360 A1 | 6/2008 | Hicks et al. |
| 2008/0181401 A1 | 7/2008 | Picquenot et al. |
| 2011/0296186 A1* | 12/2011 | Wong .................. H04L 63/0428 713/171 |
| 2015/0381387 A1 | 12/2015 | Sharan |

(Continued)

*Primary Examiner* — Mahfuzur Rahman

(74) *Attorney, Agent, or Firm* — Hewlett Packard Enterprise Patent Department

(57) ABSTRACT

Some examples relate to a pre-shared key based virtual private network. In an example, a VPN server generates a unique pre-shared key (PSK) corresponding to an identity of a VPN client. The VPN server creates a mapping between the identity and the unique PSK of the VPN client, and stores it in a database. The VPN server shares the unique PSK with the VPN client. In response to receiving an IKE packet comprising an encrypted identity of the VPN client, the VPN server decrypts the encrypted identity of the VPN client from the IKE packet to determine the identity of the VPN client associated with the IKE packet. The VPN server retrieves the unique PSK corresponding to the identity of the VPN client associated with the IKE packet from the mapping stored in the database. The VPN server establishes a VPN connection with the VPN client.

20 Claims, 5 Drawing Sheets

(56) References Cited

U.S. PATENT DOCUMENTS

2018/0359811 A1* 12/2018 Verzun .................... H04L 12/28
2020/0092328 A1 3/2020 Kim et al.
2020/0329012 A1* 10/2020 Hoffman ............. H04L 63/0272
2021/0377029 A1* 12/2021 Sloane ................. H04L 9/3242
2022/0173966 A1* 6/2022 Hill ........................ H04L 67/34

* cited by examiner

PRE-SHARED KEY BASED VIRTUAL PRIVATE NETWORK

BACKGROUND

A virtual private network (VPN) is a private network that uses a public network to connect two or more remote sites. Instead of using dedicated connections between networks, VPNs use virtual connections routed through public networks. The benefits of a VPN include increases in functionality, security, and management of the private network.

BRIEF DESCRIPTION OF THE DRAWINGS

For a better understanding of the solution, examples will now be described, with reference to the accompanying drawings, in which.

DETAILED DESCRIPTION

Figure 1:
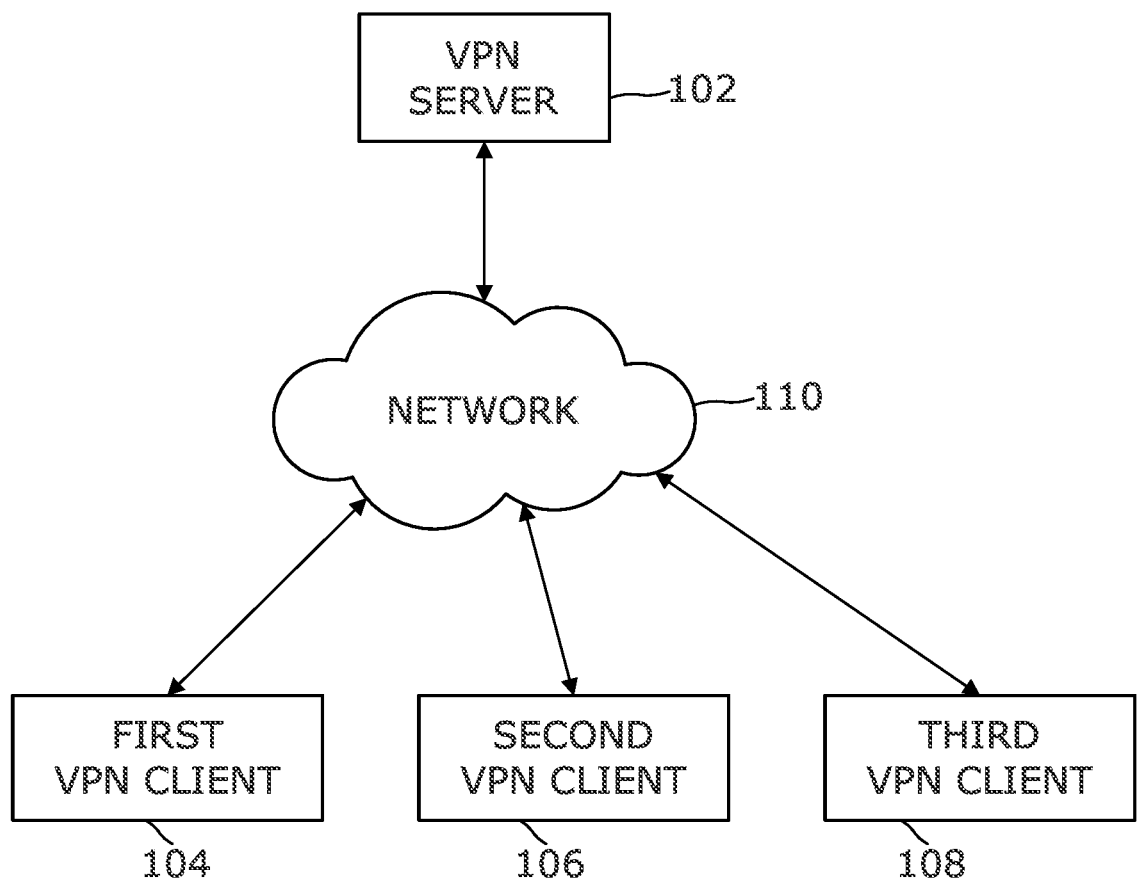
FIG. 1 is a block diagram of a computing environment for establishing a pre-shared key based virtual private network, according to some examples.

A "virtual private network" (VPN) refers to a private network connection that is built over a public network infrastructure such as the internet. A VPN connection can link two local area networks (LANs), a remote dial-up user and a LAN, etc. The traffic that flows between these two points passes through shared resources such as routers, switches, and other network equipment that make up a public wide area network (WAN) such as the internet. A VPN provides access to resources that are inaccessible on the public network. A VPN can be used, for example, for remote workers to connect to a corporate network.

To secure VPN communication while passing through the WAN, a virtual private network client (VPN client) should trust a virtual private network server (VPN server) by an authentication method. As used herein, the term "VPN client" refers to an end device or software that is seeking connection, network, or data services from a VPN. A VPN client is part of the VPN infrastructure and is the end recipient of VPN services. As used herein, a "VPN server" refers to a type of server that enables the hosting and delivery of VPN services. A VPN server establishes a secure connection between a VPN client and networks, such as an intranet.

In an implementation, a pre-shared key (PSK) is used as an authentication method between a VPN client and a VPN server. As used herein, a "pre-shared key" is a secret string of characters in cryptography that is shared between two parties using a secure channel before the PSK is used.

One of the challenges with a PSK-based authentication method is the use of a global pre-shared key for all VPN clients. The same PSK is used on all devices for authentication. This poses a great security risk. All it may take is one device to be compromised for the PSK to become useless, or rather dangerous. Since VPN clients may run on different host operating systems (OS), there is a possibility a global PSK can be decrypted on some of the operating systems by decompiling the binary or reverse engineering methods. A rogue user within an organization can take advantage of a global PSK learned through these mechanisms to set up a spoof VPN server and redirect other VPN clients' traffic to the spoofed server. In this manner, a rogue user can get to know the user credentials of other users. Thus, this method is susceptible to credential-theft attack and a compromised PSK of one VPN client could compromise other VPN clients communicating with the same VPN server.

It may be desirable to use a separate PSK for each VPN client to address the above challenges. However, manually configuring a unique PSK for every VPN client could incur a large configuration and maintenance overhead in a large-scale VPN deployment and is a challenging task from an IT administrator's perspective.

The proposed solution addresses these technical challenges by generating a unique PSK for each VPN client by a VPN server. The VPN server generates a unique pre-shared key (PSK) corresponding to an identity of a VPN client. The VPN server then creates a mapping between the identity and the unique PSK of the VPN client, and stores it in a database. The VPN server also shares the unique PSK with the VPN client. Later, in response to receiving an Internet Key Exchange (IKE) packet comprising an encrypted identity of the VPN client, the VPN server decrypts the encrypted identity of the VPN client. As used herein, "Internet Key Exchange (IKE)" refers to a key management protocol used for deriving keys for encryption and authentication over an unsecured medium, such as the internet. The VPN server decrypts the encrypted identity of the VPN client from the IKE packet to determine the identity of the VPN client associated with the IKE packet. The VPN server retrieves the unique PSK corresponding to the identity of the VPN client associated with the IKE packet from the mapping stored in the database. The VPN server then establishes a VPN connection with the VPN client.

The proposed solution doesn't require a manual generation of a PSK for each VPN client. It thus reduces the load on a system administrator. A system administrator need not manually configure a unique PSK every time a new VPN client is on-boarded to a VPN. For instance, after a unique PSK for a first VPN client is generated, the VPN server generates a unique PSK for each VPN client (e.g., a second VPN client, a third VPN client, or an $n^{th}$ VPN client) that is on-boarded to a VPN. With this approach, the challenges (e.g., credential-theft attack) with an authentication method based on the use of a global pre-shared key for all VPN clients are avoided. Since a unique PSK is used for each VPN client, a compromised PSK of one VPN client does not compromise other VPN clients communicating with the same VPN server.

The proposed solution also avoids the security issues (e.g., credential-theft attack) associated with the use of a global PSK-based authentication method since a unique PSK is generated for each VPN client.

The proposed solution also helps scale VPN clients onto a VPN network since a VPN server takes care of generating a unique PSK corresponding to each VPN client that is on-boarded. It thus provides a configuration advantage over existing implementations.

Referring now to the figures, FIG. 1 is a block diagram of an example computing environment 100 that includes a VPN server 102, a first VPN client 104, a second VPN client 106, and a third VPN client 108. In the example of FIG. 1, three VPN clients (104, 106, and 108) are depicted for simplicity. In some examples, computing environment 100 may include a different number of VPN clients.

The first VPN client 104, the second VPN client 106, the third VPN client 108, and the VPN server 102 can be communicatively coupled over a network 110 such as a local area network (LAN), wide area network (WAN), a storage area network (SAN), a campus area network (CAN), the internet, or any other type of network. In some examples, the first VPN client 104, the second VPN client 106, the third VPN client 108, and the VPN server 102 can be present in different geographical locations.

As shown in FIG. 1, a VPN client (e.g., 104) can send a login request to the VPN server 102 for establishing a VPN connection. The VPN client (e.g., 104) can include an end device (e.g., a desktop computer, a notebook computer, a tablet computer, a thin client, or any other processing device) or software that is seeking connection, network, or data services from a virtual private network.

In an example, the VPN client 104 can be connected to the internet. When the VPN client 104 wants to connect with the VPN server 102 for the first time to establish a VPN connection, the VPN client 104 creates a login request message. The login request message can include an identity of the VPN client 102.

Examples of the identity of the VPN client 102 can include a media access control (MAC) address of the VPN client 104, a user name provided through the VPN client 104, or a string of characters (e.g., alphabets, numerals, alphanumeric, or any other character) assigned to the VPN client 104. As used herein, "media access control address (MAC address)" refers to a unique identifier assigned to a network interface controller (NIC) for use as a network address in communications within a network segment. The user name could be provided, for example, by a user of the VPN client 104, a system/network administrator, the VPN client 104, or any other device. The string of characters could be assigned, for example, by a system/network administrator, the VPN client 104, or any other device.

The login request message can be sent over, for example, a Transport Layer Security (TLS) connection. As used herein, "TLS" refers to a protocol that provides communication security between client/server applications that communicate with each other over a network, such as the internet. TLS enables privacy, integrity and protection for the data that is transmitted between different nodes on a network. In another example, the login request message can be sent through a browser-based Hypertext Transfer Protocol Secure (HTTPS) connection. The login request message can be sent to the VPN server 102 over a network such as a LAN, a WAN, a SAN, the internet, or any other type of network.

In response to receiving the login request message, the VPN server 102 obtains the identity of the VPN client 104 from the message. The VPN server 102 reads the login request message and retrieves the identity of the VPN client 104 from the message.

The VPN server 102 generates a unique pre-shared key (PSK) corresponding to the identity of the VPN client 104. As used herein, a "pre-shared key (PSK)" is a secret string of characters in cryptography that is shared between two parties via a secure channel before the PSK is used. The PSK can be a random number of a pre-defined length (e.g., 256 bytes). The pre-defined length could be defined, for example, by a user, the VPN server 102, or another device. In some examples, the VPN server 102 uses jitter entropy to generate a random number for use as PSK. As used herein, "jitter" refers to any deviation in, or displacement of, the signal pulses in a high-frequency digital signal. The deviation can be in terms of amplitude, phase timing or the width of the signal pulse. As used herein, "jitter entropy" refers to an entropy source based on central processing unit (CPU) execution time jitter. There are many different factors that can impact the amount of time it takes to execute the same set of instructions on a CPU. If one measures the execution time multiple times, it will show variation i.e. jitter. Since it is difficult to predict this jitter, the jitter could be used as an entropy source.

To make the PSK unique to the VPN server 102, the VPN server 102 can append a VPN server 102 identity to the PSK. Some examples of the VPN server 102 identity could include a serial number of the VPN server 102 or a media access control (MAC) address of the VPN server 102. Appending a VPN server 102 identity of the VPN server 102 that generates the PSK ensures that the PSK generated by the VPN server 102 does not collide with a PSK generated by a different VPN server.

The VPN server 102 creates a mapping between the identity and the unique PSK of the VPN client 104. In an example, if the identity of the VPN client 104 includes a MAC address of the VPN client 104, then the mapping can be "MAC address: unique PSK of the VPN client". In another example, if the identity of the VPN client 104 includes a user name provided via the VPN client 104, then the mapping can be "user name: unique PSK of the VPN client".

The VPN server 102 can store the mapping in a database (e.g., a table). As used herein, a "database" in computing refers to an organized collection of data stored and accessed electronically. Small databases can be stored on a file system, while large databases can be hosted on computer clusters or cloud storage. In the current context, the database can be present on the VPN server 102. In other examples, the database can be present on another device communicatively coupled to the VPN server 102. The database can be a persistent database (i.e. data is stored in a non-volatile storage medium).

The VPN server 102 can generate a public-private key pair. The public-private key pair can be generated based on public-key cryptography (or asymmetric cryptography) mechanism that use pairs of related keys. Each key pair consists of a public key and a corresponding private key. Key pairs are generated with cryptographic algorithms. Security of public-key cryptography depends on keeping the private key secret; the public key can be openly distributed without compromising security. Anyone with a public key can encrypt a message, yielding a cipher text (i.e. encrypted text transformed from plaintext), but only those who know the corresponding private key can decrypt the cipher text to obtain the original message.

The VPN server 102 uses the private key to encrypt the unique PSK of the VPN client 104. The VPN server 102 generates a connection profile of the VPN client 104. In some examples, the connection profile of the VPN client 104 comprises the identity of the VPN client 104, the encrypted unique PSK of the VPN client 104, and the public key generated by the VPN server 102. The VPN server 102 sends the connection profile to the VPN client 104, for example, over a TLS connection. In this manner, the VPN client 104 receives the unique PSK of the VPN client 104 and the public key from the VPN server 102.

To establish an Internet protocol security (IPsec) tunnel with the VPN server 102, the VPN client 104 sends an encrypted identity of the VPN client 104 to the VPN sever. As used herein, "Internet protocol security" refers to a secure network protocol suite that authenticates and encrypts packets of data to provide secure encrypted communication between two computers over an Internet Protocol network. As used herein, "IPsec tunnel" refers to an IPsec connection between two participating entities (e.g., a VPN server 102 and a VPN client 104) in a VPN to secure communication between them.

The VPN client 104 uses the public key received from the VPN server 102 to generate an encrypted identity of the VPN client 104. The VPN client 104 uses the public key to encrypt the identity of the VPN client 104. As used herein, "encryption" refers to process of using an algorithm to transform information into a code to make the code unreadable for unauthorized users. Once the information is encoded, the information requires decryption to be understood.

In some examples, the VPN client 104 sends the encrypted identity of the VPN client 104 to the VPN server 102 in the form of Internet Key Exchange (IKE) packets, for example, as IKE_SA_INIT packets. The identity of the VPN client 104 is encrypted to protect the privacy of the VPN client 104 (or the user that uses the VPN client 104). In the absence of encryption, the identity of the VPN client 104 can be snooped upon by a third-party, for example, a hacker, an advertisement provider, and internet service provider. The VPN client 104 sends the encrypted identity of the VPN client 104 to the VPN server 102 each time the VPN client 104 wants to establish a new connection with the VPN server 102 after the first login. A mapping between the identity and the unique PSK of the VPN client 104 already exists on the VPN server 102, as mentioned in para [0026]. As used herein, "Internet Key Exchange (IKE)" refers to a key management protocol used for exchanging keys for encryption and authentication over an unsecured medium, such as the internet. IKE can be used in conjunction with an Internet Protocol Security standard protocol and provides security for virtual private networks' (VPNs) negotiations and network access to random hosts. IKE provides tunnel management for IPsec and authenticates end entities. The IPsec tunnels generated by IKE are used to encrypt, decrypt, and authenticate user traffic between network devices (e.g., VPN client 104 and VPN server 102). "IKEv1" and "IKEv2" are two different versions of IKE protocol.

IKE protocol is used to set up a security association (SA) in the IPsec protocol suite. A SA specifies security properties that are recognized by communicating devices (e.g., VPN client 104 and VPN server 102). A SA is a relationship between two or more entities (e.g., VPN client 104 and VPN server 102) that describes how the entities will use security services to communicate securely. The SA contains all the information required for the two peers (e.g., VPN client 104 and VPN server 102) to exchange data securely.

Communication using IKE begins with IKE_SA_INIT exchanges. The first pair of messages (IKE_SA_INIT) negotiate cryptographic algorithms, exchange nonce (e.g., an arbitrary number that can be used just once in a cryptographic communication), and perform a key exchange such as a Diffie-Hellman exchange [DH]. In some examples, the VPN client 104 sends the encrypted identity of the VPN client 104 to the VPN server 102 in the form of IKE_SA_INIT payloads. To make the encrypted payload random every time, the VPN client 104 adds a timestamp along with the identity of the VPN client 104, prior to the encryption. As used herein, a "timestamp" refers to a sequence of characters or encoded information identifying when a certain event occurred, usually giving date and time of day, sometimes accurate to a small fraction of a second.

In another example, communication using IKE begins when the initiator (e.g., VPN client 104) sends a proposal to the responder (e.g., VPN server 102). The first exchange between nodes (e.g., VPN client 104 and VPN server 102) establishes the basic security policy. The initiator proposes (e.g., VPN client 104) the encryption and authentication algorithms to be used. The responder (e.g., VPN server 102) chooses the appropriate proposal and sends it to the initiator. The next exchange passes Diffie-Hellman public keys and further negotiation is encrypted within the IKE SA.

The VPN server 102 receives an IKE packet (e.g., IKE_SA_INIT packet) comprising an encrypted identity of the VPN client 104, for example, over a TLS connection. The encrypted identity of the VPN client can be present in the vendor ID payload of the IKE packet. The vendor ID payload is used by an IKE daemon to advertise support for an IKE feature. The vendor ID that is contained in the payload identifies the feature.

The VPN server 102 decrypts the encrypted identity of the VPN client 104 and the timestamp from the IKE packet to determine the identity of the VPN client 104 associated with the IKE packet. As used herein, "decryption" refers to a process of transforming information that has been rendered unreadable through encryption back to its unencrypted form. The VPN server 102 uses the private key to decrypt the encrypted identity of the VPN client 104 from the IKE packet. The VPN server 102 also removes the timestamp from the identity of the VPN client 104.

After decryption, the VPN server 102 retrieves the unique PSK corresponding to the identity of the VPN client 104 from the mapping in the database. As described earlier, the VPN server 102 creates a mapping between the identity of the VPN client 104 and the unique PSK of the VPN client 104 in a database. After the VPN server 102 determines the identity of the VPN client 104 associated with a received IKE packet, the VPN server 102 queries the database to retrieve the unique PSK corresponding to the identity of the VPN client 104.

In response to retrieving the unique PSK corresponding to the identity of the VPN client 104, the VPN server 102 establishes a VPN connection with the VPN client 104. In some examples, establishing a VPN connection includes establishing an IPsec VPN tunnel between the VPN client 104 and the VPN server 102. An IPsec VPN tunnel consists of tunnel setup and applied security. During tunnel setup, the peers (e.g., VPN client 104 and VPN server 102) establish security associations, as described earlier. After the tunnel is established, IPsec protects the traffic sent between the two tunnel endpoints (e.g., between VPN client 104 and VPN server 102) by applying the security parameters defined by the SAs during tunnel setup.

When the VPN client 104 sends a login request message (including the identity of the VPN client 104) to the VPN server 102 for the first time, the VPN server 102 retrieves the identity of the VPN client 104 from the message. The VPN server 102 then generates a unique PSK corresponding to the identity of the VPN client 104. The VPN server 102 creates a mapping between the identity and the unique PSK of the VPN client 104, and stores it in a database. The VPN server 102 encrypts the unique PSK using the private key of a public-private key pair generated by the VPN server 102. The VPN server 102 then shares the encrypted unique PSK with the VPN client 104 along with the private key. Later, in response to a new login request from the VPN client 104 that includes an encrypted identity of the VPN client 104, the VPN server 102 decrypts the encrypted identity of the VPN client 104 to determine the identity of the VPN client 104. The VPN server 102 retrieves the unique PSK corresponding to the identity of the VPN client 104 from the mapping stored in the database. The VPN server 102 then establishes a VPN connection with the VPN client 102.

The VPN connection established in the above manner avoids the security issues (e.g., credential-theft attack) associated with the use of a global PSK-based authentication method since a unique PSK is generated for each VPN client that is on-boarded. With this approach, the challenges (e.g., credential-theft attack) with an authentication method based on the use of a global pre-shared key for all VPN clients are avoided. Since a unique PSK is used for each VPN client, a compromised PSK of one VPN client does not compromise other VPN clients communicating with the same VPN server. Also, since the PSK is shared with the VPN client in an encrypted manner, the PSK cannot be snooped upon by a third-party, for example, a hacker, an advertisement provider, and internet service provider. Furthermore, the solution doesn't require a manual generation of a PSK for each VPN client. It thus reduces the load on a system administrator, who need not manually configure a unique PSK every time a new VPN client is on-boarded to a VPN.

In some examples, each time the VPN server 102 retrieves the unique PSK corresponding to the identity of the VPN client 104 from the database, the VPN server 102 associates a timestamp with the mapping in the database. The timestamp is updated after each retrieval. This mechanism helps a VPN server 102 identify a stale VPN client 104 timestamp and delete the mapping associated with the stale VPN client timestamp from the database. As used herein, the term "stale VPN client timestamp" refers to a timestamp associated with a VPN client that is past a pre-defined period (e.g., data and/or time).

In response to a determination by the VPN server 102 that a timestamp in a mapping is past a pre-defined period, the VPN server 102 deletes the mapping from the database. In some examples, in response to a determination by the VPN server 102 that a timestamp in a mapping is past a pre-defined period, a user can delete the mapping from the database. In both scenarios, this helps manage the storage space on the VPN server 102.

Figure 2:
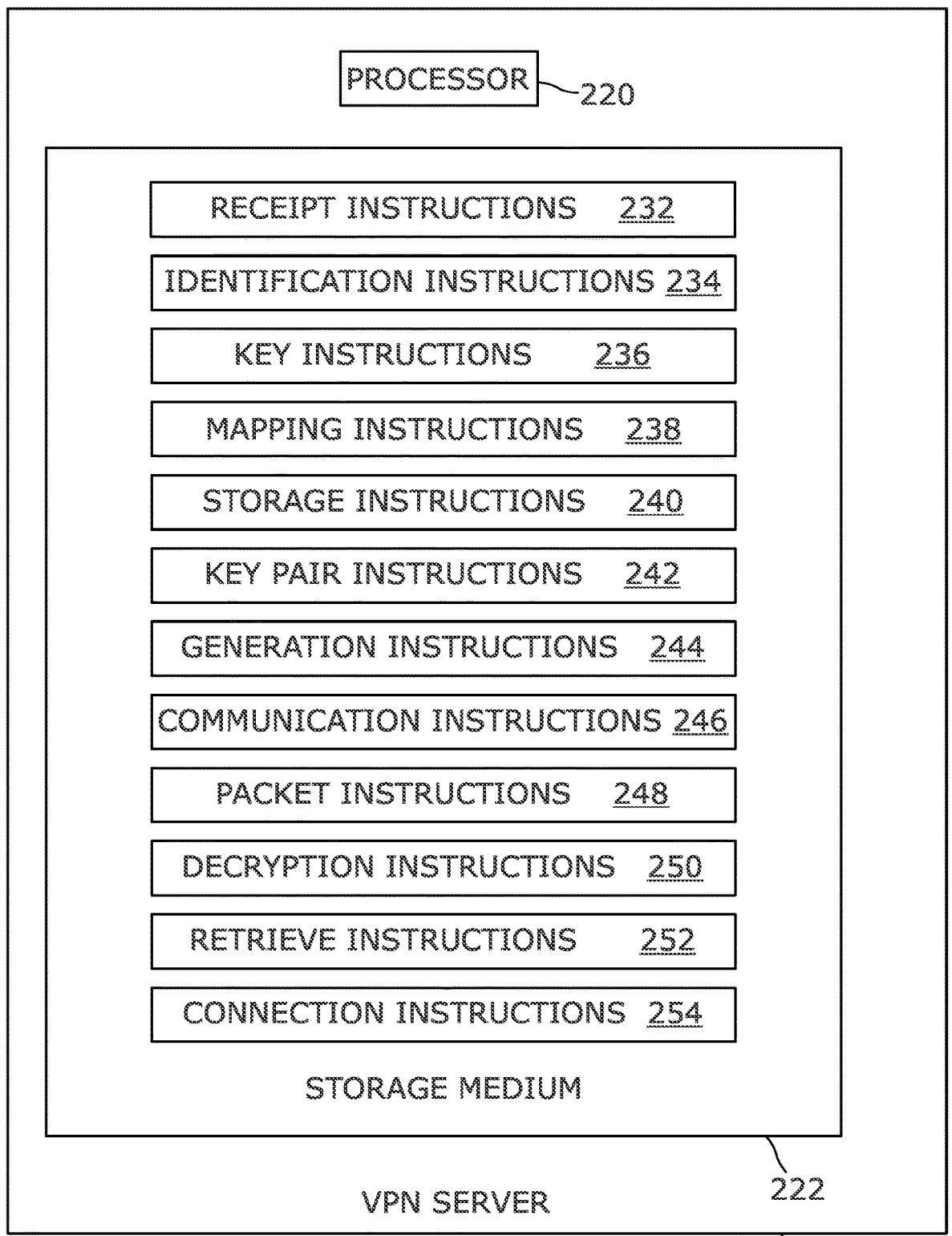
FIG. 2 illustrates a VPN server of the computing environment of FIG. 1, according to some examples.

FIG. 2 illustrates a VPN server 200 of the computing environment of FIG. 1, according to some examples. The VPN server 200 can be analogous to the VPN server 102 of FIG. 1, respectively, in which like reference numerals correspond to the same or similar, though perhaps not identical, and components. For the sake of brevity, components or reference numerals of FIG. 2 having the same or similarly described function in FIG. 1 are not being described in connection with FIG. 2. Said components or reference numerals may be considered alike.

The VPN server 200 can include a processor 220 (or multiple processors) and a storage medium 222. The processor 220 can include a Central Processing Unit (CPU), a microprocessor, a programmable gate array, a microcontroller, or any other processing logic that interprets and executes machine-readable instructions stored in storage medium 222.

The storage medium 222 can store information and machine-readable instructions executable on the processor 220 to perform various tasks. The storage medium 222 can be Synchronous DRAM (SDRAM), Double Data Rate (DDR), Rambus DRAM (RDRAM), Rambus RAM, etc., or storage memory media such as a floppy disk, a hard disk, a CD-ROM, a DVD, a pen drive, and the like.

When a VPN client wants to connect with the VPN server 200 for the first time, the VPN client creates a login request message. The login request message can include an identity of the VPN client. Examples of the identity can include a MAC address of the VPN client, a user name provided through the VPN client, or a string of characters (e.g., alphabets, numerals, alphanumeric, or any other character) assigned to the VPN client. The VPN client sends the login request message to the VPN server 200 over, for example, a TLS connection.

In some examples, the processor 220 executes receipt instructions 232 on the VPN server 200 to receive a login request from a VPN client (not shown). The login request can be received via a message over, for example, a TLS connection. The login request message can include an identity of the VPN client. Examples of the identity can include a MAC address of the VPN client, a user name provided through the VPN client, or a string of characters (e.g., alphabets, numerals, alphanumeric, or any other character) assigned to the VPN client.

The user name could be provided, for example, by a user of the VPN client, a system/network administrator, the VPN client, or any other device. The string of characters could be assigned, for example, by a system/network administrator, the VPN client, or any other device. The login request message can received over a network such as a LAN, a WAN, a SAN, the internet, or any other type of network.

In response to receiving the login request message, the processor 220 executes identification instructions 234 on the VPN server 200 to obtain the identity of the VPN client from the message. The VPN server 200 reads the login request message and retrieves the identity of the VPN client therefrom.

The processor 220 executes key instructions 236 on the VPN server 200 to generate a unique pre-shared key (PSK) corresponding to the identity of the VPN client. The PSK can be a random number of a pre-defined length (e.g., 256 bytes). The pre-defined length could be defined, for example, by a user, the VPN server 200, or another device.

The processor 220 executes mapping instructions 238 on the VPN server 200 to create a mapping between the identity and the unique PSK of the VPN client. In an example, if the identity of the VPN client includes a MAC address of the VPN client, then the mapping can be "MAC address: unique PSK of the VPN client". In another example, if the identity of the VPN client includes a user name provided via the VPN client, then the mapping can be "user name: unique PSK of the VPN client".

The processor 220 executes storage instructions 240 on the VPN server 200 to store the mapping in a database (e.g., a table). The database can be present on the VPN server 200. In other examples, the database can be present on another device communicatively coupled to the VPN server.

The processor 220 executes key pair instructions 242 on the VPN server 200 to generate a public-private key pair. The public-private key pair can be generated based on public-key cryptography (or asymmetric cryptography) mechanism that use pairs of related keys.

The processor 220 executes generation instructions 244 on the VPN server 200 to generate a connection profile of the VPN client. In some examples, the connection profile of the VPN client comprises the identity of the VPN client, the unique PSK of the VPN client, and the public key generated by the VPN server. The processor 220 executes communication instructions 246 on the VPN server to send the connection profile to the VPN client, for example, over a TLS connection. In this manner, the VPN client receives the unique PSK of the VPN client and the public key from the VPN server 200.

To establish an Internet protocol security (IPsec) tunnel with the VPN server 200, the VPN client can send an encrypted identity of the VPN client to the VPN server 200. The VPN client can use the public key received from the VPN server 200 to generate an encrypted identity of the VPN client. In some examples, the VPN client can send the encrypted identity of the VPN client to the VPN server 200 in the form of Internet Key Exchange (IKE) packets, for example, as IKE_SA_INIT packets.

The processor 220 executes packet instructions 248 on the VPN server 200 to receive an IKE packet (e.g., IKE_SA_INIT packet) comprising an encrypted identity of the VPN client, for example, over a TLS connection. The processor 220 executes decryption instructions 250 on the VPN server 200 to decrypt the encrypted identity of the VPN client from the IKE packet to determine the identity of the VPN client associated with the IKE packet. After decryption, the processor 220 executes retrieve instructions 252 on the VPN server 200 to retrieve the unique PSK corresponding to the identity of the VPN client from the mapping in the database.

The processor 220 executes connection instructions 254 on the VPN server 200 to establish a VPN connection with the VPN client. In some examples, establishing a VPN connection includes establishing an IPsec VPN tunnel between the VPN client and the VPN server 200.

Figure 3:
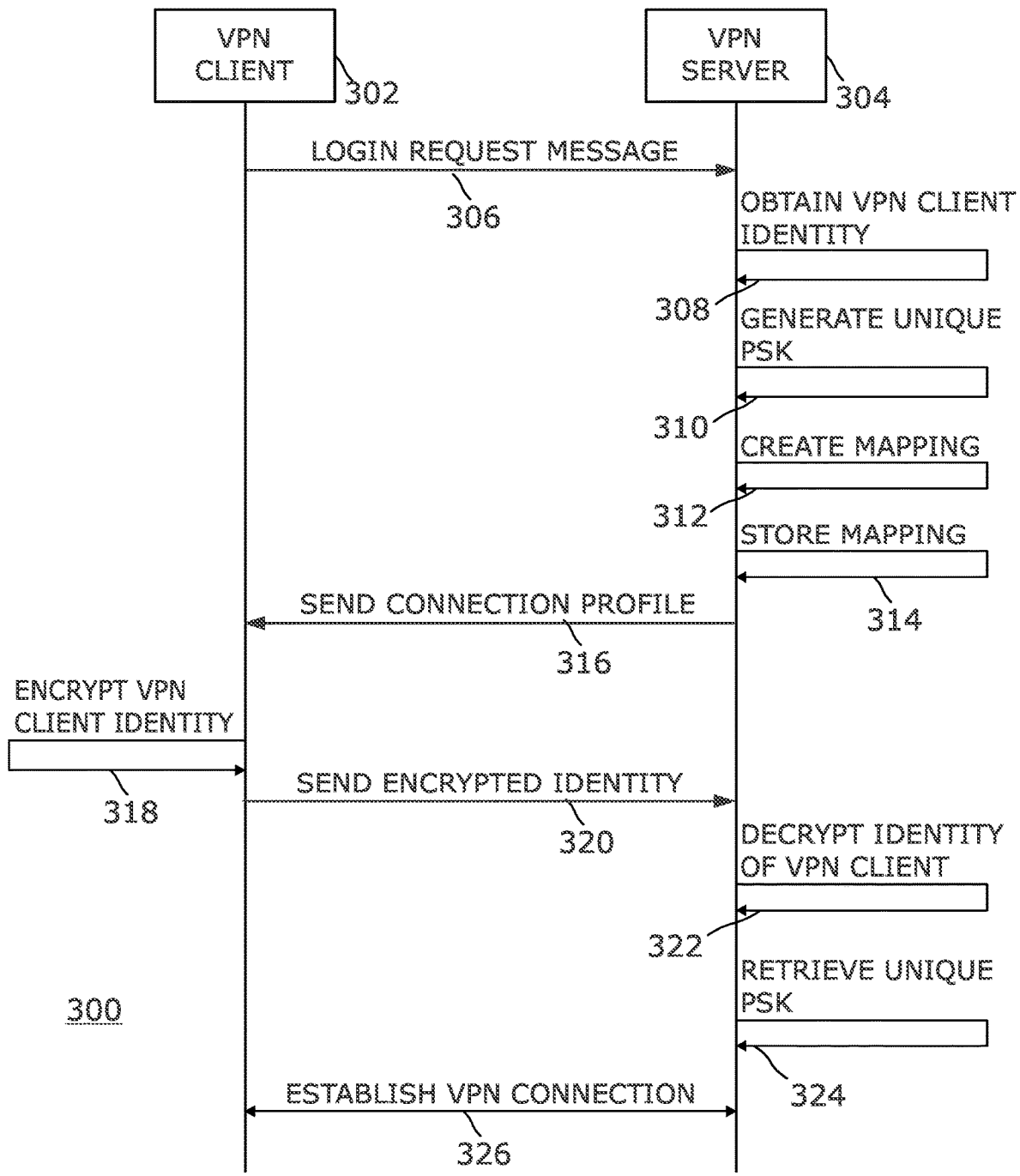
FIG. 3 is a block diagram of a communication flow for establishing a pre-shared key based virtual private network, according to some examples.

FIG. 3 is a block diagram of a communication flow 300, according to some examples. In FIG. 3, a VPN client 302 can be connected to the internet. When the VPN client 302 wants to connect with the VPN server 304 for the first time to establish a VPN connection, the VPN client 302 creates a login request message. The login request message can include an identity of the VPN client 302. Examples of the identity can include a MAC address of the VPN client, a user name provided through the VPN client, or a string of characters (e.g., alphabets, numerals, alphanumeric, or any other character) assigned to the VPN client. The VPN client 302 sends the login request message to the VPN server 304 for establishing a VPN connection. The login request message 306 can be sent to the VPN server 304 over a network such as a LAN, a WAN, a SAN, the internet, or any other type of network.

In response to receiving the login request message 306, the VPN server 304 obtains 308 the identity of the VPN client 302 from the message. The VPN server 304 reads the login request message 306 and retrieves the identity of the VPN client 302 therefrom. The VPN server 304 generates 310 a unique pre-shared key (PSK) corresponding to the identity of the VPN client 302.

To make the PSK unique to the VPN server 304, the VPN server 304 can append a VPN server 304 identity to the PSK. Some examples of the VPN server 304 identity could include a serial number of the VPN server 304 or a media access control (MAC) address of the VPN server 304. Appending a VPN server 304 identity of the VPN server 304 that generates the PSK ensures that the PSK generated by the VPN server 304 does not collide with a PSK generated by a different VPN server 304.

The VPN server 304 creates 312 a mapping between the identity and the unique PSK of the VPN client 302. In an example, if the identity of the VPN client 302 includes a MAC address of the VPN client 302, then the mapping can be "MAC address: unique PSK of the VPN client". In another example, if the identity of the VPN client 302 includes a user name provided via the VPN client 302, then the mapping can be "user name: unique PSK of the VPN client".

The VPN server 304 can store 314 the mapping in a database (e.g., a table). The VPN server 304 can generate a public-private key pair. The public-private key pair can be generated based on public-key cryptography (or asymmetric cryptography) mechanism that use pairs of related keys.

The VPN server 304 generates a connection profile of the VPN client 302. In some examples, the connection profile of the VPN client 302 comprises the identity of the VPN client 302, the unique PSK of the VPN client 302, and the public key generated by the VPN server 304.

The VPN server 304 generates a connection profile of the VPN client 302 after receiving the first login request message from the VPN client 302. The first login request message includes an identity of the VPN client 302. Once a connection profile of the VPN client 302 comprising the identity of the VPN client 302, the unique PSK of the VPN client 302, and the public key is generated, the VPN server 304 sends 316 the connection profile to the VPN client 302, for example, over a TLS connection. As mentioned in paras [62] and [63], the VPN server 304 can generate a public-private key pair. The public-private key pair is generated to protect the identity of the VPN client 302 that is sent from the VPN client 302 in a later phase. The VPN server 304 uses the private key to encrypt the unique PSK of the VPN client 302. The connection profile of the VPN client 302 comprising the encrypted PSK of the VPN client 302 and the public key generated by the VPN server 304 is sent to the VPN client 302. The VPN client 302 receives the unique PSK of the VPN client 302 and the public key from the VPN server 304. The VPN client 302 then decrypts the encrypted PSK using the public key.

To establish an Internet protocol security (IPsec) tunnel with the VPN server 304, the VPN client 302 generates 318 and sends 320 an encrypted identity of the VPN client 302 to the VPN sever. The VPN client 302 uses the public key received from the VPN server 304 to generate an encrypted identity of the VPN client 302.

In some examples, the VPN client 302 sends the encrypted identity of the VPN client 302 to the VPN server 304 in the form of Internet Key Exchange (IKE) packets, for example, as IKE_SA_INIT packets. In some examples, the VPN client 302 sends the encrypted identity of the VPN client 302 to the VPN server 304 in the form of IKE_SA_INIT payloads.

The VPN server 304 receives an IKE packet (e.g., IKE_SA_INIT packet) comprising an encrypted identity of the VPN client 302, for example, over a TLS connection. The VPN server 304 decrypts 322 the encrypted identity of the VPN client 302 from the IKE packet to determine the identity of the VPN client 302 associated with the IKE packet.

After decryption, the VPN server 304 retrieves 324 the unique PSK corresponding to the identity of the VPN client 302 from the mapping in the database. In response to retrieving the unique PSK corresponding to the identity of the VPN client 302, the VPN server 304 establishes 326 a VPN connection with the VPN client 302. In some examples, establishing a VPN connection includes establishing an IPsec VPN tunnel between the VPN client 302 and the VPN server 304.

Figure 4:
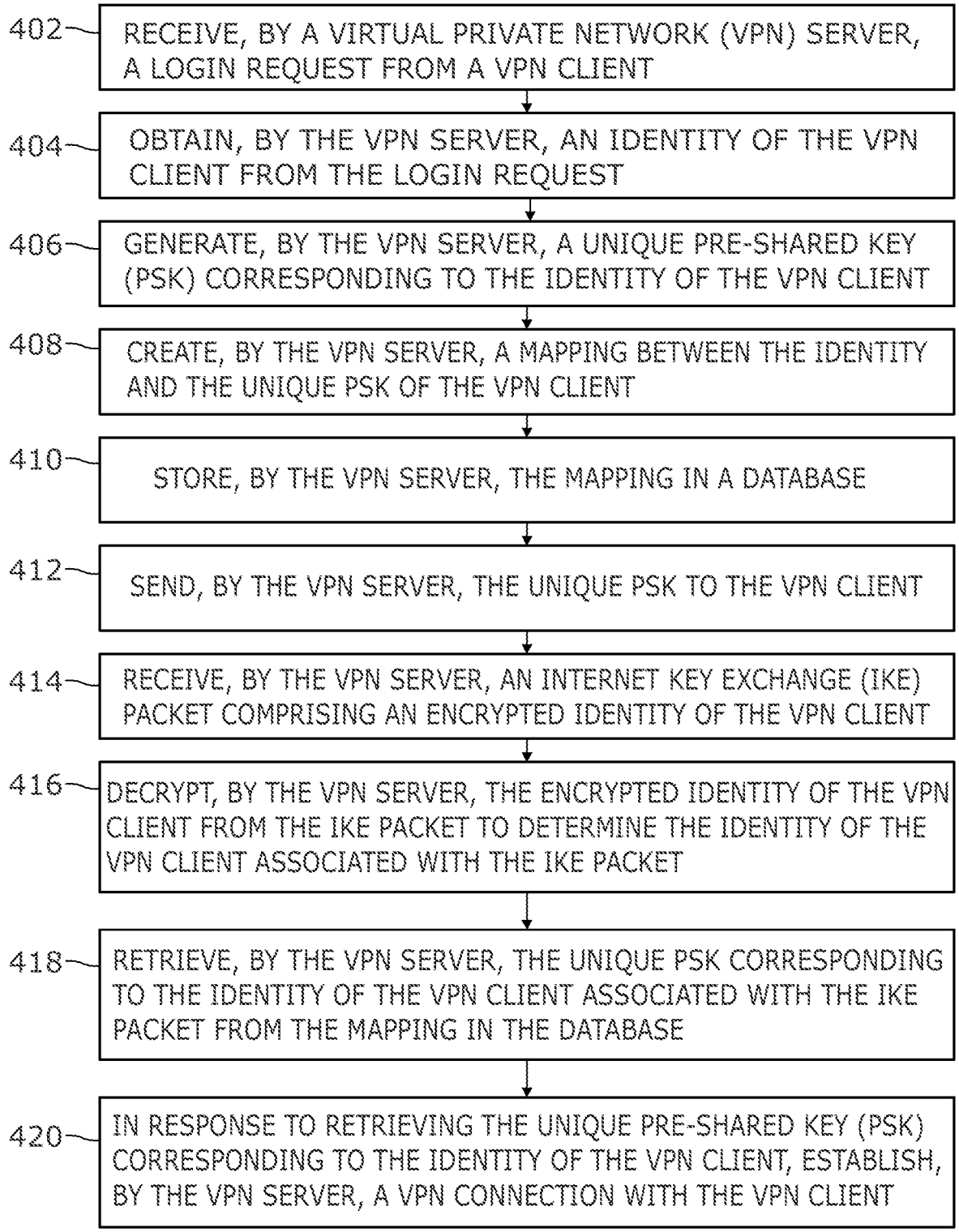
FIG. 4 is a flowchart of a method for establishing a pre-shared key based virtual private network, according to some examples.

FIG. 4 is a flowchart of method 400, according to some examples. Method 400 can be performed by a system including a processor, where the system can include a computer or multiple computers. For example, method 400 can at least partially be executed on the VPN server 102 of FIG. 1 or the VPN server 200 of FIG. 2.

At block 402, method 400 includes receiving, by a virtual private network (VPN) server, a login request from a VPN client. When a VPN client wants to connect with the VPN server for the first time to establish a VPN connection, the VPN client creates a login request message. The login request message can include an identity of the VPN client. The login request message can be sent over, for example, a TLS connection. In one example, VPN server 102 and VPN client 104 are explained in using the method 400. Other similar devices (e.g., VPN client 302 and VPN server 304) can be used.

At block 404, method 400 includes obtaining, by the VPN server, an identity of the VPN client from the login request. The VPN server 102 reads the login request message and retrieves the identity of the VPN client 104 from the message. At block 406, method 400 includes generating, by the VPN server, a unique pre-shared key (PSK) corresponding to the identity of the VPN client. The PSK can be a random number of a pre-defined length (e.g., 256 bytes). The pre-defined length could be defined, for example, by a user, the VPN server, or another device. In some examples, the VPN server uses jitter entropy to generate a random number for use as PSK.

At block 408, method 400 includes creating, by the VPN server, a mapping between the identity and the unique PSK of the VPN client. In an example, if the identity of the VPN client includes a MAC address of the VPN client, then the association between the identity and the unique PSK of the VPN client can be represented as, for example, "MAC address of the VPN client:unique PSK of the VPN client". In another example, if the identity of the VPN client includes a user name provided via the VPN client, then the association between the identity and the unique PSK of the VPN client can be represented as, for example, "user name of the VPN client:unique PSK of the VPN client".

At block 410, method 400 includes storing, by the VPN server, the mapping in a database. The database can be present on the VPN server. In other examples, the database can be present on another device communicatively coupled to the VPN server.

At block 412, method 400 includes sending, by the VPN server, the unique PSK to the VPN client. The VPN server generates a connection profile of the VPN client. In some examples, the connection profile of the VPN client comprises the identity of the VPN client, the encrypted unique PSK of the VPN client, and the public key generated by the VPN server. The VPN server sends the connection profile to the VPN client, for example, over a TLS connection. In this manner, the VPN client receives the unique PSK of the VPN client and the public key from the VPN server.

At block 414, method 400 includes receiving, by the VPN server, an Internet Key Exchange (IKE) packet comprising an encrypted identity of the VPN client. The identity of the VPN client is encrypted to protect the privacy of the VPN client. In the absence of encryption, the identity of the VPN client 104 can be snooped upon by a third-party, for example, a hacker, an advertisement provider, and internet service provider. The VPN client sends the encrypted identity of the VPN client to the VPN server each time the VPN client wants to establish a new connection with the VPN server after the first login.

At block 416, method 400 includes decrypting, by the VPN server, the encrypted identity of the VPN client from the IKE packet to determine the identity of the VPN client associated with the IKE packet.

At block 418, method 400 includes retrieving, by the VPN server, the unique PSK corresponding to the identity of the VPN client associated with the IKE packet from the mapping in the database. After decryption, the VPN server retrieves the unique PSK corresponding to the identity of the VPN client from the mapping in the database.

At block 420, method 400 includes, in response to retrieving the unique pre-shared key (PSK) corresponding to the identity of the VPN client, establishing, by the VPN server, a VPN connection with the VPN client. As described earlier, the VPN server creates a mapping between the identity of the VPN client and the unique PSK of the VPN client in a database. After the VPN server determines the identity of the VPN client associated with a received IKE packet, the VPN server queries the database to retrieve the unique PSK corresponding to the identity of the VPN client. In some examples, establishing a VPN connection includes establishing an IPsec VPN tunnel between the VPN client and the VPN server. An IPsec VPN tunnel consists of tunnel setup and applied security.

Figure 5:
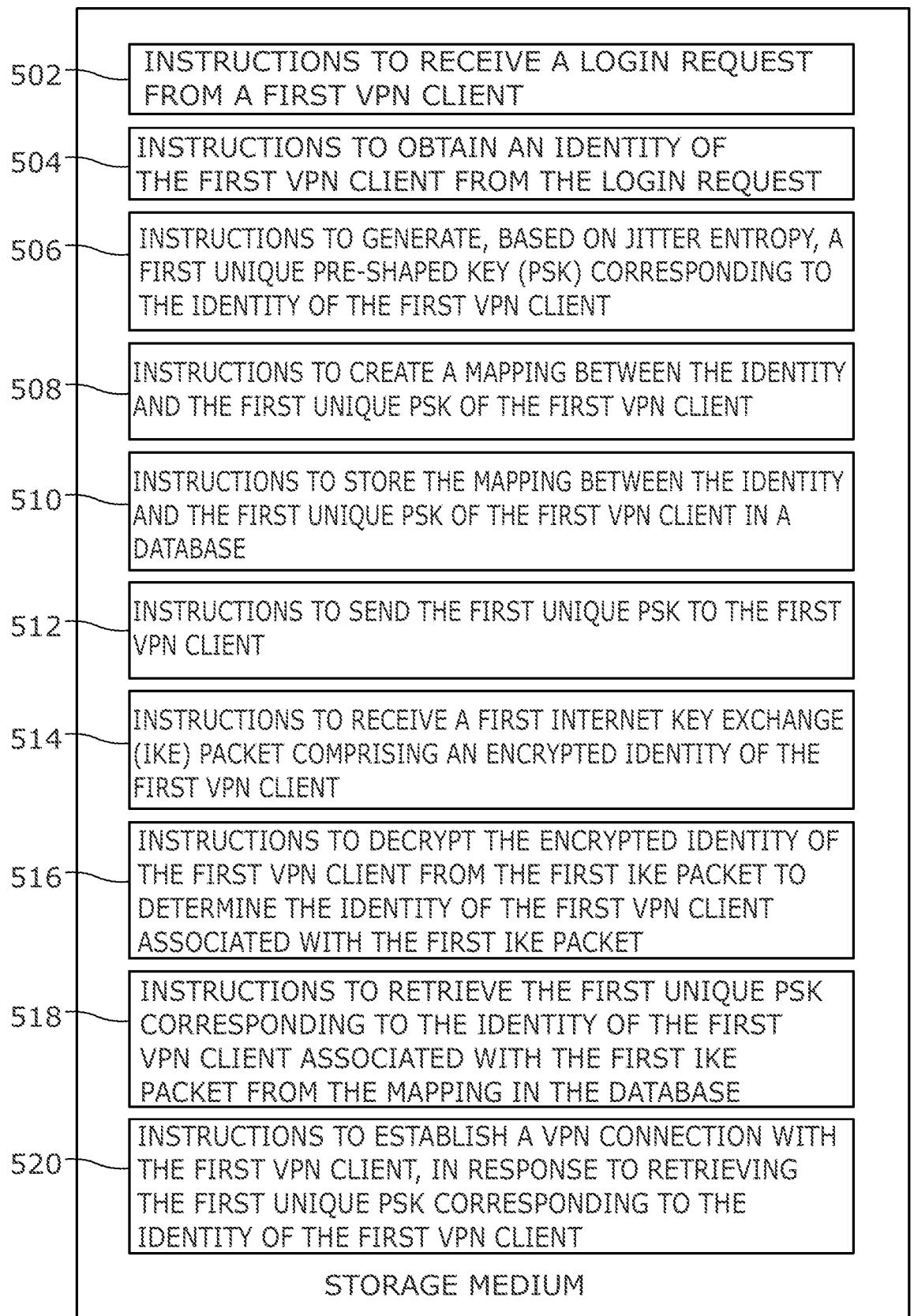
FIG. 5 is a block diagram of a storage medium storing machine-readable instructions for establishing a pre-shared key based virtual private network, according to some examples.

FIG. 5 is a block diagram of a non-transitory machine-readable or computer-readable storage medium 500 storing machine-readable instructions that upon execution cause a system to perform various tasks. The system can include a computer (e.g., a VPN server) or a collection of computers.

The machine-readable instructions include instructions 502 on a computer (e.g., a VPN server) to receive a login request from a first VPN client. The login request can be received via a message over, for example, a TLS connection. The login request message can include an identity of the first VPN client. Examples of the identity can include a MAC address of the first VPN client, a user name provided through the VPN client, or a string of characters (e.g., alphabets, numerals, alphanumeric, or any other character) assigned to the first VPN client.

The user name could be provided, for example, by a user of the first VPN client, a system/network administrator, the first VPN client, or any other device. The string of characters could be assigned, for example, by a system/network administrator, the first VPN client, or any other device. The login request message can received over a network such as a LAN, a WAN, a SAN, the internet, or any other type of network.

In response to receiving the login request message, the machine-readable instructions include instructions 504 to obtain the identity of the first VPN client from the message. The instructions 504 read the login request message and retrieves the identity of the first VPN client therefrom.

The machine-readable instructions include instructions 506 to generate a unique pre-shared key (PSK) corresponding to the identity of the first VPN client. The PSK can be a random number of a pre-defined length (e.g., 256 bytes). The pre-defined length could be defined, for example, by a user, a VPN server, or another device.

The machine-readable instructions include instructions 508 to create a mapping between the identity and the unique PSK of the first VPN client. In an example, if the identity of the first VPN client includes a MAC address of the VPN client, then the mapping can be "MAC address: unique PSK of the first VPN client". In another example, if the identity of the VPN client includes a user name provided via the first VPN client, then the mapping can be "user name: unique PSK of the first VPN client".

The machine-readable instructions include instructions 510 to store the mapping in a database (e.g., a table). The database can be present on a computer (e.g., a VPN server). The machine-readable instructions include instructions to generate a public-private key pair. The public-private key pair can be generated based on public-key cryptography (or asymmetric cryptography) mechanism that use pairs of related keys.

The machine-readable instructions include instructions to generate a connection profile of the first VPN client. In some examples, the connection profile of the first VPN client comprises the identity of the first VPN client, the unique PSK of the first VPN client, and the public key generated by the instructions 512. The machine-readable instructions include instructions 512 to send the connection profile to the first VPN client, for example, over a TLS connection. In this manner, the first VPN client receives the unique PSK of the first VPN client and the public key.

To establish an Internet Protocol security (IPsec) tunnel with the computer (e.g., a VPN server), the first VPN client can send an encrypted identity of the first VPN client to the computer. The first VPN client can use the public key received from the computer to generate an encrypted identity of the first VPN client. In some examples, the first VPN client can send the encrypted identity of the first VPN client to the computer in the form of Internet Key Exchange (IKE) packets, for example, as IKE_SA_INIT packets. The machine-readable instructions include instructions 514 to receive an IKE packet (e.g., IKE_SA_INIT packet) comprising an encrypted identity of the first VPN client, for example, over a TLS connection.

The machine-readable instructions include instructions 516 to decrypt the encrypted identity of the first VPN client from the IKE packet to determine the identity of the first VPN client associated with the IKE packet. After decryption, the machine-readable instructions include instructions 518 to retrieve the unique PSK corresponding to the identity of the first VPN client from the mapping in the database.

The machine-readable instructions include instructions 520 to establish a VPN connection with the first VPN client. In some examples, establishing a VPN connection includes establishing an IPsec VPN tunnel between the first VPN client and the computer.

In some examples, the instructions 502 may further receive a login request from a second VPN client. The instructions 504 may further obtain an identity of the second VPN client from the login request of the second VPN client. The instructions 506 may further generate, based on jitter entropy, a second unique PSK corresponding to the identity of the second VPN client.

The instructions 508 may further create a mapping between the identity of the second VPN client and the second unique PSK. The instructions 510 may further store the mapping between the identity of the second VPN client and the second unique PSK in the database.

The instructions 512 may further send the second unique PSK to the second VPN client. The instructions 514 may further receive a second IKE packet comprising an encrypted identity of the second VPN client, from the second VPN client. The instructions 516 may further decrypt the encrypted identity of the second VPN client from the second IKE packet to determine the identity of the second VPN client associated with the second IKE packet.

The instructions 518 may further retrieve the second unique PSK corresponding to the identity of the second VPN client associated with the second IKE packet, from the mapping in the database. The instructions 520 may further establish a VPN connection with the second VPN client, in response to retrieving the second unique PSK corresponding to the identity of the second VPN client.

For simplicity of explanation, the example method of FIG. 4 is shown as executing serially, however, it is to be understood and appreciated that the present and other examples are not limited by the illustrated order. The example systems of FIGS. 1, 2, 3, and 5, and the method of FIG. 4 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general-purpose or special-purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general-purpose or special-purpose computer. The computer-readable instructions can also be accessed from memory and executed by a processor.

It should be understood that the above-described examples of the present solution are for illustration only. Although the solution has been described in conjunction with a specific example thereof, numerous modifications may be possible without materially departing from the teachings and advantages of the subject matter described herein. Other substitutions, modifications, and changes may be made without departing from the spirit of the present solution. All of the features disclosed in this specification (including any accompanying claims, abstract, and drawings), and/or all of the steps of any method or process so disclosed, may be combined in any combination, except combinations where at least some of such features and/or steps are mutually exclusive.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

As used herein, the articles "a" and "an" are intended to include one or more items and may be used interchangeably with "one or more." Further, as used herein, the article "the" is intended to include one or more items referenced in connection with the article "the" and may be used interchangeably with "the one or more." Also, as used herein, the terms "has," "have," "having," or the like are intended to be open-ended terms. As used herein, the term "includes" is intended to mean "includes but not limited to", and the term "including" is intended to mean "including but not limited to". Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The invention claimed is:

1. A method comprising:
   receiving, by a virtual private network (VPN) server, a login request from a VPN client;
   obtaining, by the VPN server, an identity of the VPN client from the login request;
   generating, by the VPN server, a unique pre-shared key (PSK) corresponding to the identity of the VPN client;
   creating, by the VPN server, a mapping between the identity and the unique PSK of the VPN client;
   storing, by the VPN server, the mapping in a database;
   sending, by the VPN server, the unique PSK to the VPN client;
   receiving, by the VPN server, an Internet Key Exchange (IKE) packet comprising an encrypted identity of the VPN client;
   decrypting, by the VPN server, the encrypted identity of the VPN client from the IKE packet to determine the identity of the VPN client associated with the IKE packet;
   retrieving, by the VPN server, the unique PSK corresponding to the identity of the VPN client associated with the IKE packet from the mapping in the database; and
   in response to retrieving the unique pre-shared key (PSK) corresponding to the identity of the VPN client, establishing, by the VPN server, a VPN connection with the VPN client.

2. The method of claim 1, further comprising:
   generating, by the VPN server, a public-private key pair; and
   sending, by the VPN server, a public key from the public-private key pair to the VPN client, wherein the encrypted identity of the VPN client is generated through the public key.

3. The method of claim 2, further comprising sending, by the VPN server, the public-private key pair to a new VPN client.

4. The method of claim 2, wherein sending the unique PSK to the VPN client comprises:
   generating, by the VPN server, a connection profile of the VPN client comprising the unique PSK of the VPN client, the identity of the VPN client and the public key; and
   sending, by the VPN server, the connection profile to the VPN client.

5. The method of claim 1, wherein establishing the VPN connection comprises creating an Internet Protocol Security (IPsec) tunnel between the VPN client and the VPN server.

6. The method of claim 1, further comprising:
   associating, by the VPN server, a timestamp with the mapping in the database, in response to retrieving the unique pre-shared key (PSK) corresponding to the identity of the VPN client.

7. The method of claim 6, further comprising:
   in response to determining, by the VPN server, that the timestamp in the mapping is past a pre-defined period, deleting the mapping from the database.

8. The method of claim 6, further comprising updating the timestamp in the mapping each time the unique PSK corresponding to the identity of the VPN client is retrieved from the database.

9. The method of claim 1, wherein a serial number of the VPN server is appended to the unique PSK.

10. A VPN server comprising:
    a processor; and
    a non-transitory storage medium storing instructions that, when executed by the processor, cause the processor to:
    receive a login request from a VPN client;
    obtain an identity of the VPN client from the login request;
    generate a unique pre-shared key (PSK) corresponding to the identity of the VPN client;
    create a mapping between the identity and the unique PSK of the VPN client;
    store the mapping in a database;
    send the unique PSK to the VPN client;
    receive an Internet Key Exchange (IKE) packet comprising an encrypted identity of the VPN client along with a timestamp;
    decrypt the encrypted identity of the VPN client from the IKE packet to determine the identity of the VPN client associated with the IKE packet;
    retrieve the unique PSK corresponding to the identity of the VPN client associated with the IKE packet from the mapping in the database; and
    establish a VPN connection with the VPN client, in response to retrieving the unique pre-shared key (PSK) corresponding to the identity of the VPN client.

11. The VPN server of claim 10, wherein a MAC address of the VPN server is appended to the unique PSK.

12. The VPN server of claim 10, wherein a timestamp is associated with the mapping in the database.

13. The VPN server of claim 10, wherein the identity of the VPN client comprises a media access control (MAC) address of the VPN client.

14. The VPN server of claim 10, wherein the unique PSK is of 256 bytes.

15. A non-transitory machine-readable storage medium comprising instructions that upon execution cause a VPN server to:
    receive a login request from a first VPN client;
    obtain an identity of the first VPN client from the login request;
    generate, based on jitter entropy, a first unique pre-shared key (PSK) corresponding to the identity of the first VPN client;
    create a mapping between the identity and the first unique PSK of the first VPN client;
    store the mapping between the identity and the first unique PSK of the first VPN client in a database;
    send the first unique PSK to the first VPN client;
    receive a first Internet Key Exchange (IKE) packet comprising an encrypted identity of the first VPN client;
    decrypt the encrypted identity of the first VPN client from the first IKE packet to determine the identity of the first VPN client associated with the first IKE packet;
    retrieve the first unique PSK corresponding to the identity of the first VPN client associated with the first IKE packet from the mapping in the database; and
    establish a VPN connection with the first VPN client, in response to retrieving the first unique PSK corresponding to the identity of the first VPN client.

16. The non-transitory machine-readable storage medium of claim 15, further comprising instructions that upon execution cause the VPN server to:
    receive a login request from a second VPN client;
    obtain an identity of the second VPN client from the login request of the second VPN client;
    generate, based on jitter entropy, a second unique PSK corresponding to the identity of the second VPN client;
    create a mapping between the identity of the second VPN client and the second unique PSK;

store the mapping between the identity of the second VPN client and the second unique PSK in the database;

send the second unique PSK to the second VPN client;

receive a second IKE packet comprising an encrypted identity of the second VPN client, from the second VPN client;

decrypt the encrypted identity of the second VPN client from the second IKE packet to determine the identity of the second VPN client associated with the second IKE packet;

retrieve the second unique PSK corresponding to the identity of the second VPN client associated with the second IKE packet, from the mapping in the database; and establish a VPN connection with the second VPN client, in response to retrieving the second unique PSK corresponding to the identity of the second VPN client.

17. The non-transitory machine-readable storage medium of claim 15, wherein one of a serial number of the VPN server or a MAC address of the VPN server is appended to the first unique PSK.

18. The non-transitory machine-readable storage medium of claim 15, wherein the first unique PSK is sent to the first VPN client over a Transport Layer Security (TLS) connection.

19. The non-transitory machine-readable storage medium of claim 15, wherein the identity of the first VPN client comprises a user name provided through the first VPN client.

20. The non-transitory machine-readable storage medium of claim 15, wherein the identity of the first VPN client comprises a string of characters assigned to the first VPN client.

* * * * *